United States Patent [19]
Benford et al.

[11] Patent Number: 5,967,938
[45] Date of Patent: Oct. 19, 1999

[54] MULTIPLE SPEED BICYCLE HAVING SINGLE DRIVE SPROCKET

[76] Inventors: James R. Benford, 2225 B Corinne Ct. South, St. Petersburg, Fla. 33712; Robert L. Benford, 225 E. Shore Dr., Silver Lake, N.H. 03875

[21] Appl. No.: 09/095,742

[22] Filed: Jun. 11, 1998

[51] Int. Cl.[6] ............................................. F16H 3/44
[52] U.S. Cl. ..................... 475/297; 475/287; 475/289
[58] Field of Search .................................. 475/207, 209, 475/218, 286, 287, 288, 289, 296, 297; 74/501.5 R, 500.5, 502.2, 502.4

[56] References Cited

U.S. PATENT DOCUMENTS

| | | | |
|---|---|---|---|
| 4,973,297 | 11/1990 | Bergles | 475/289 |
| 5,078,664 | 1/1992 | Nagano | 475/297 |
| 5,273,500 | 12/1993 | Nagano | 475/296 X |
| 5,562,563 | 10/1996 | Shoge | 475/298 |
| 5,676,022 | 10/1997 | Ose | 74/502.2 |
| 5,785,625 | 7/1998 | Matsuo et al. | 475/297 |
| 5,845,727 | 12/1998 | Miyazawa et al. | 180/205 |
| 5,855,530 | 1/1999 | Huang et al. | 475/289 |
| 5,863,270 | 1/1999 | Chen et al. | 475/289 |

*Primary Examiner*—Dirk Wright
*Assistant Examiner*—Peter T. Kwon
*Attorney, Agent, or Firm*—Ronald E. Smith

[57] ABSTRACT

A multiple speed bicycle of the coaster brake type has a single drive sprocket and a drive chain in longitudinal alignment with one another. A sun gear is keyed to the main drive axle of the bicycle and rotates with the main drive axle. The sun gear engages a drive gear mounted on a planet gear axle and a planet gear is mounted on the same planet gear axle. Driving and driven satellite gears are mounted on satellite gear axles that are pivotally mounted on a nonrotatable ring concentric with the main drive axle. The satellite gears have differing diameters and differing numbers of teeth, one for each GEAR of the bicycle, and are positioned radially outwardly of the planet gear, in circumferentially spaced relation to one another. The planet gear orbits the main drive axle in incremental degrees of angular rotation when the bicycle operator manipulates a remote control member on the handlebar of the bicycle to change from one preselected gear to another preselected gear. Each gear change causes the planet gear to engage a different driving satellite gear and drive its companion driven satellite gear into meshing engagement with a rotatably mounted ring gear that is connected to the drive sprocket. A clutch and gear selector assembly for enabling the gear changing is controlled by a control cable that extends downwardly from the remote control member.

10 Claims, 9 Drawing Sheets

MULTIPLE SPEED BICYCLE HAVING SINGLE DRIVE SPROCKET

BACKGROUND OF THE INVENTION

1. Field of the Invention

This invention relates, generally, to multi-speed bicycles. More particularly, it relates to a gear mechanism that provides easy gear changing in a coaster brake bicycle having a single drive sprocket.

2. Description of the Prior Art

Most multiple speed bicycles are of the well-known derailleur type. As is well-known, such systems include multiple drive sprockets and a complex mechanism for lifting the drive chain from one drive sprocket to another in order to change gear ratios. Thirty two problems commonly associated with derailleur systems are listed in Sloan's "New Complete Book Of All-Terrain Bicycles," and twenty nine problems associated with such systems are denoted in Glenn's "New Complete Bicycle Manual." Moreover, a degree of skill is required to properly use a derailleur system. To master such a system, an athlete must memorize a number of complex procedures; Frank Berto's "Complete Guide To Upgrading Your Bike" humorously describes different shifting patterns as "The Crossover, The Half-Step, The Alpine, The Half-Step Plus Granny, The Wide Step, The Wide Step Triple, and The Rhumba Gear." Needless to say, all of these whimsical names represent real-life techniques for accomplishing various gear changes, and serious bike riders take pride in mastering these techniques, all of which are required as a result of the inherent complexity of derailleur systems.

One early speed-changing system that eschewed the derailleur system, described in Delong's "Guide To Bicycles And Bicycling," is the now obsolete Sturmey-Archer three speed system that includes a planetary gear system built into the rear axle. Delong describes a number of other systems as well.

A more recent entry in the nonderailleur market is the Shimano four speed or seven speed rear axle design; it represents a major advance over other rear wheel drive systems. Both the Shimano and Sturmey-Archer contributions to the art employ or employed a single control knob.

However, the art still lacks an inexpensive, simple-in-structure, reliable, multi-speed, single drive sprocket system with easy to operate gear changing means. The ideal system would include a dial and pointer mounted on a handle bar that would enable gear changing simply by turning the pointer on the dial; it would not make any skill demands on the rider as do the derailleur systems.

In view of the art considered as a whole at the time the present invention was made, it was not obvious to those of ordinary skill in this art how the ideal system could be provided.

SUMMARY OF THE INVENTION

The long-standing but heretofore unfulfilled need for an apparatus that overcomes the limitations of the prior art is now met by a new, useful, and nonobvious invention. The present invention is an apparatus for providing speed selection, gear changing, and power transmission in a coaster brake bicycle. The novel apparatus includes a sun gear keyed to the main drive axle of a bicycle for simultaneous and conjoint rotation therewith and a bevel gear that is journaled to said main drive axle so that it does not rotate with it. The sun gear and the bevel gear are disposed on said main drive axle in axially spaced apart relation to one another.

A drive gear is mounted on a planet gear axle of the apparatus, said planet gear axle being disposed radially outwardly of and parallel to said main drive axle. The drive gear is meshingly engaged with the sun gear so that rotation of the sun gear imparts rotation to the drive gear and the planet gear axle. A planet gear is mounted to the planet gear axle, in axially spaced apart relation to the drive gear, so that rotation of the planet gear axle is imparted to the planet gear. The opposite ends of the planet gear axle are journaled to a housing that is integrally formed with the bevel gear that is journaled to the main drive axle. Accordingly, rotation of said bevel gear about said main drive axle, which occurs only when said main drive axle is not rotating, effects rotation of said housing about said main drive axle and orbital movement of said planet gear axle and planet gear about said main drive axle.

A plurality of driving satellite gears are mounted in circumferentially spaced relation to one another and in radially outwardly spaced relation to the main drive axle and the planet gear axle. Each of the driving satellite gears is mounted to a satellite gear axle that is pivotally mounted to a stationary ring that is concentric with the main drive axle. A plurality of driven satellite gears, each of which is mounted to a preselected satellite gear axle in axially spaced relation to a driving satellite gear, is provided so that rotation of a driving satellite gear imparts simultaneous and corresponding rotation to a driven satellite gear. The planet gear selectively engages the driving satellite gears as the gears are changed.

The novel assembly further includes a ring gear that is positioned in concentric relation to the main drive axle; the ring gear is secured to the drive sprocket so that rotation of the ring gear imparts rotation to the drive sprocket. The ring gear is meshingly engaged with a driven satellite gear so that rotation of a driven satellite gear by a driving satellite gear effects rotation of said ring gear about said main drive axle.

Moreover, a bias means is provided for biasing each of the driven satellite gears out of meshing engagement with the ring gear when in repose. The driven satellite gears selectively meshingly engage the ring gear as each bias means is respectively overcome by the selective meshing engagement of a driving satellite gear by said planet gear.

The novel structure further includes a clutch and gear selector means, of which the bevel gear journaled to the main drive axle is a part, for selectively causing the planet gear to orbit around the main drive axle in discrete, predetermined angular increments.

The planet gear selectively engages a preselected driving satellite gear and overcomes the bias means to drive an associated driven satellite gear into meshing engagement with the ring gear when the planet gear is displaced in said discrete angular or orbital relation to said main drive axle by said clutch and gear selector means.

A handlebar-mounted control means controls operation of the clutch and gear selector means. The handlebar-mounted control means includes a control cable having a proximal end positioned near the handlebar and a distal end connected to the clutch and gear selector means. The handlebar-mounted control means further includes a dial upon which is imprinted a plurality of indicia indicating differing gear settings, and a pointer means movably mounted with respect to the dial so that a bicycle operator changes gear settings by discontinuing forward pedaling to stop rotation of the main drive axle, moving the pointer means from one indicia means to another, and resuming pedaling. Movement of the pointer means effects movement of the control cable. The control cable is mounted for axial and rotational movement; more particularly, it is displaced in a distal-to-proximal or "up" direction to disengage the clutch and gear selector means and in a proximal-to-distal or "down" direction to engage the clutch and gear selector means. The control cable is rotated about its axis to change from one gear setting to another; the change is made only when the clutch and gear selector means is disengaged, i.e., when the control means and hence the control cable is in its "up" position.

The invention further includes an auxiliary braking means for braking the bicycle during the moment that gears are being changed. The auxiliary braking means includes a disc mounted to the drive sprocket, a pawl pivotally mounted to a crank arm, a brake pad secured to a free end of the pawl, and a bias means for urging the brake pad into frictional engagement with a peripheral edge of the disc. The brake pad is configured to slide substantially friction-free when the drive sprocket is rotating in response to pedaling of said bicycle, and it is configured to frictionally engage the peripheral edge of the disc when the drive sprocket is disengaged from the main drive axle of the bicycle.

While other means of arranging reliable meshing engagement between planet and satellite gears are available and within the scope of this invention, the preferred method, a reliable and inexpensive arrangement, is to make the sum of the diameters of each satellite gear pair (driving and driven) a constant; this causes the locus of the gear arrangement to be a circle concentric with the main drive axle.

It is a primary object of this invention to provide a multispeed bicycle having a gear shifting apparatus that is not subject to the limitations of derailleur systems, said limitations being caused by the derailleurs forcing the chain out of straight alignment with the sprockets, and the necessity of jumping the chain from one sprocket to another.

A more specific object is to provide a gear shifting apparatus that does not require memorization of gear changing procedures or athletic ability to accomplish gear changes.

Another object is to provide a multi-speed bicycle having a gear shifting apparatus that works on bicycles equipped with coaster brakes.

Still another object is to provide a light-in-weight and small-in-size gear shifting apparatus that provides a wide range of gear ratios and which can be sized to fit bike sizes including children and adult sizes.

Yet another object is to provide a system that can be set back to a low starting speed while the bicycle is at rest.

These and other important objects, features, and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
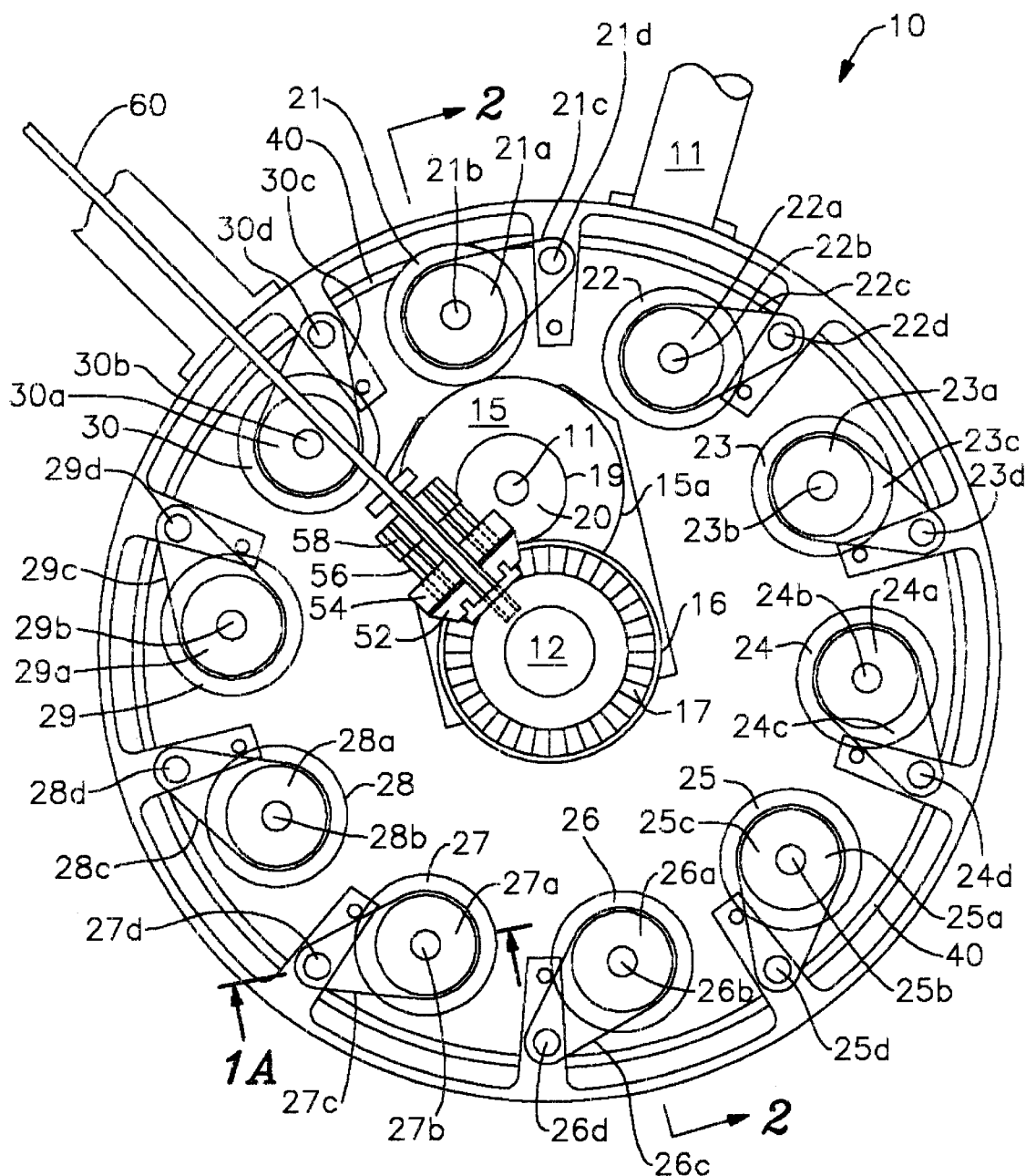
FIG. 1 is a side elevational view of an illustrative embodiment of the novel assembly, including a first embodiment of the novel clutch assembly.
Figure 2:
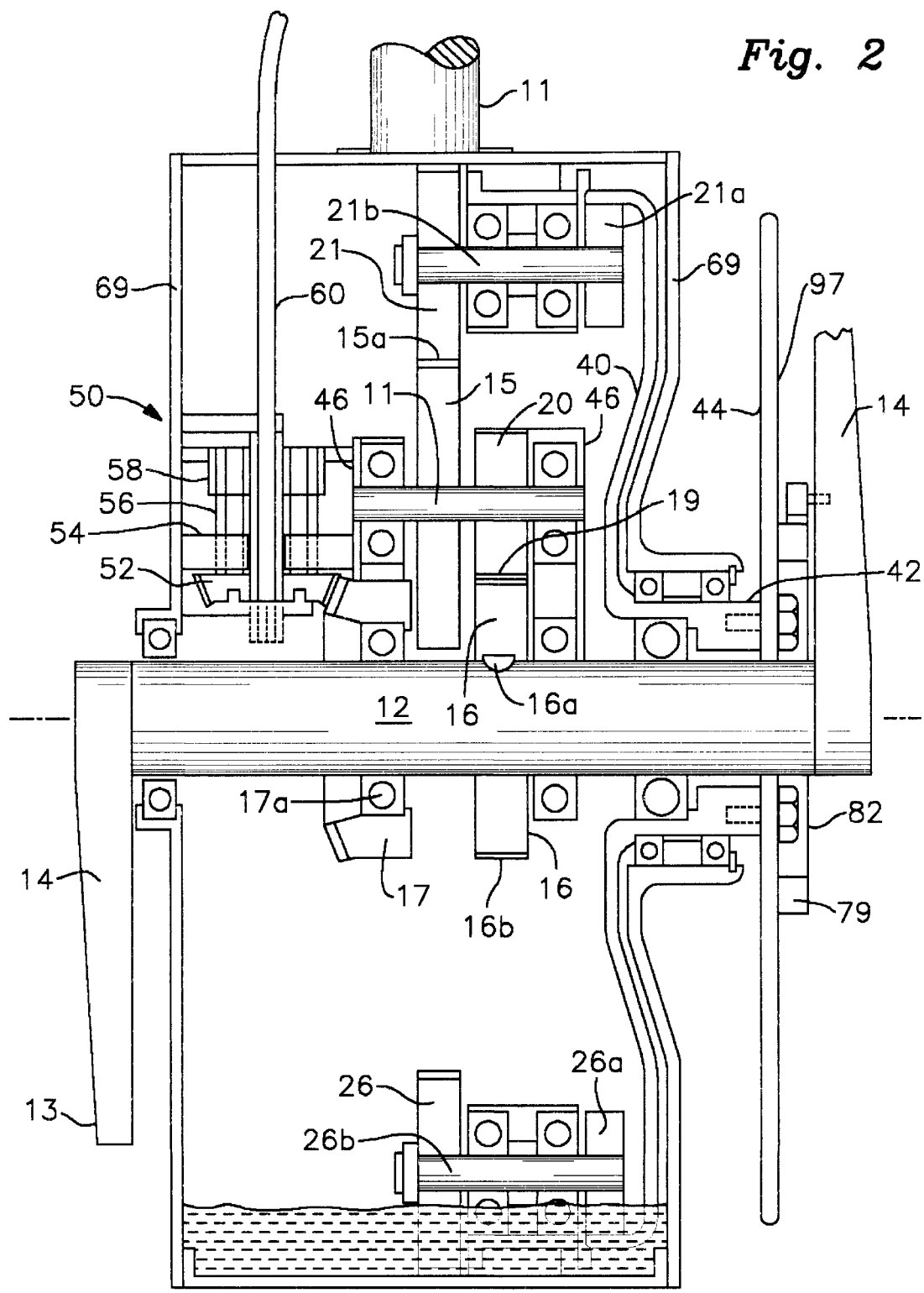
FIG. 2 is a sectional view taken along line 2—2 in FIG. 1.

Referring now to FIGS. 1 and 2, it will there be seen that an exemplary embodiment of the invention is denoted as a whole by the reference numeral 10. Seat tube 11 is conventional and forms no part of the invention, per se.

Axle 12 is the main drive axle of a bicycle; it is disposed transversely to the direction of travel, i.e., it is disposed transversely to the longitudinal axis of symmetry of the bike, not shown.

As is well-known, main drive axle 12 is rotated by a pair of pedals, not shown, positioned on opposite sides of the bike's longitudinal axis of symmetry. The pedals are rotatably mounted to the respective distal free ends 13 of crank arms 14 which are depicted in FIG. 2.

Pedal-driven rotation of main drive axle 12 effects simultaneous and corresponding rotation of sun gear 16 because key 16a (FIG. 2) keys said sun gear 16 to said main drive axle 12. Bevel gear 17, which is a part of the novel clutch and gear selector mechanism and which rotates when the gears of the bicycle are being changed in the manner set forth hereinafter, is not connected to sun gear 16; note from FIG. 2 that said bevel gear is journaled to main drive shaft 12, in axially spaced apart relation to sun gear 16, by bearings 17a.

More particularly, bevel gear 17 does not rotate when a selected speed setting is in place; when a bike (not shown) equipped with the novel apparatus is in motion, sun gear 16 spins around its axis of rotation, but bevel gear 17 does not spin due to its journaled relation to main drive shaft 12.

Figure 3:
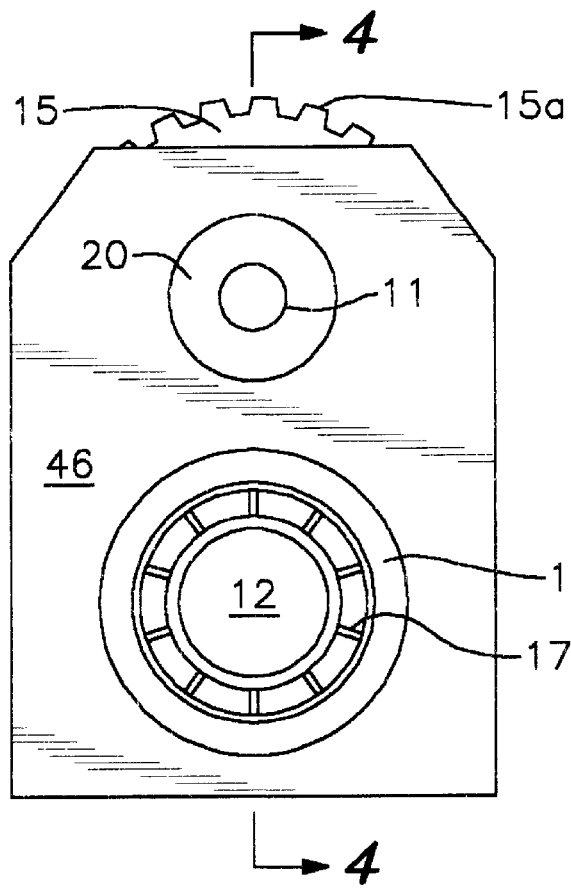
FIG. 3 is an end view of the planet gear housing.
Figure 4:
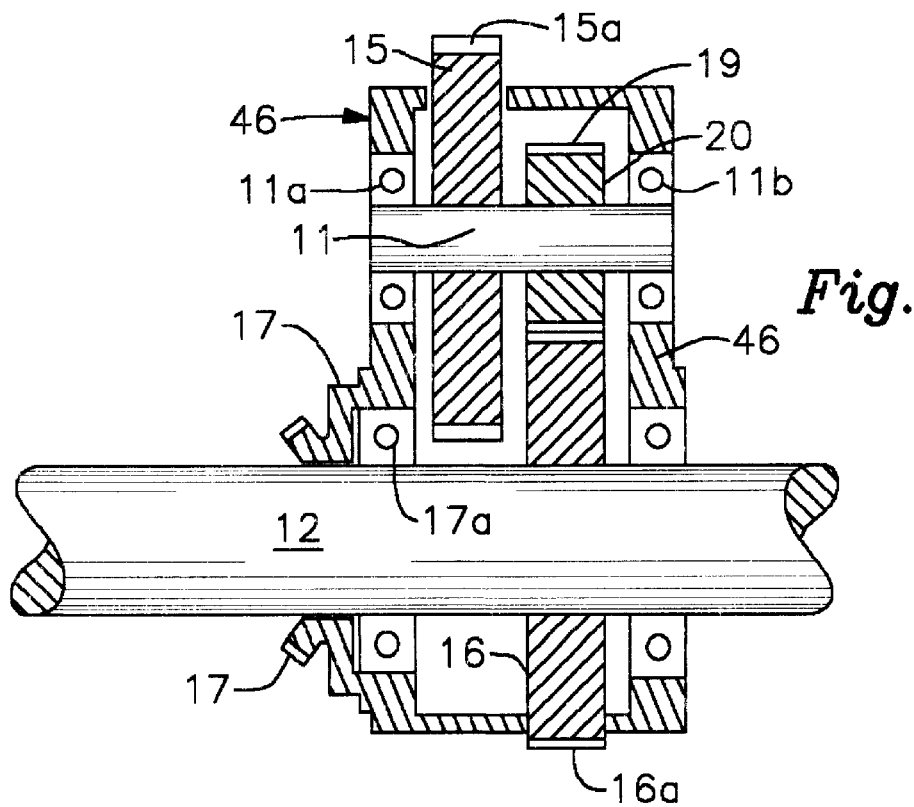
FIG. 4 is a sectional view taken along line 4—4 in FIG. 3.

Teeth 16b of sun gear 16 mesh with teeth 19 of drive gear 20 and thereby effect rotation of drive gear 20 about planet gear axle 11. Planet gear 15 having teeth 15a is keyed to planet gear axle 11 and rotates conjointly therewith. Planet gear axle 11 is positioned radially outwardly of main drive axle 12 and is disposed parallel thereto. The opposite ends of planet gear axle 11 are journaled as depicted in a housing 46 which is best depicted in FIGS. 3 and 4. Bevel gear 17 is formed integrally with housing 46 (see FIG. 4) so that planet gear axle 11 describes an orbital path about main drive axle 12 when said bevel gear is caused to rotate in the manner described below.

A plurality of pairs of satellite gears, denoted driving satellite gears 21–30 and driven satellite gears 21a–30a (FIG. 1), are disposed in equidistantly spaced, circumferentially disposed relation to main drive axle 12. More particularly, said satellite gear pairs are mounted for conjoint rotation on satellite gear axles 21b–30b. To avoid cluttering the drawings, the bearings depicted in FIG. 2 that enable rotation of axles 11, 12, and 21b are not numbered.

In FIG. 1, planet gear 15 is depicted in meshing engagement with driving satellite gear 21 so that gear 21 rotates in response to rotation of gear 15. Since driven satellite gear 21a is also mounted on satellite gear axle 21b, rotation of said gear 15 also causes rotation of driven satellite gear 21a. The unnumbered teeth of said driven satellite gear 21a meshingly engage the unnumbered teeth of ring gear 40, causing ring gear 40 to rotate at a predetermined speed of rotation.

Figure 1A:
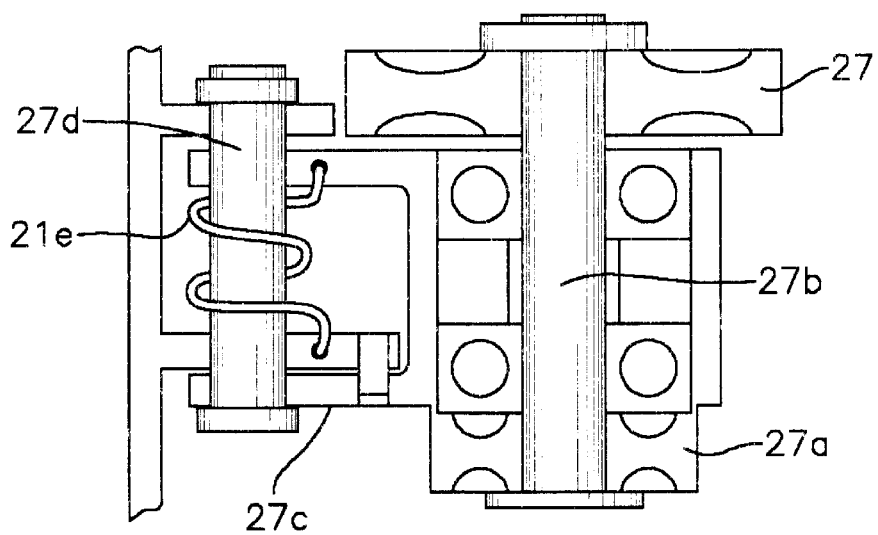
FIG. 1A is a sectional view taken along line 1A—1A in FIG. 2.

Note from FIG. 1 that driving satellite gears 22–30 and driven satellite gears 22a–30a are not in meshing engagement with ring gear 40 when satellite gear 21a is in such engagement. Each satellite gear axle 21b–30b is independently mounted on a bracket 21c–30c for pivotal movement about an axle means 21d–30d and is biased away from meshing engagement with ring gear 40 by bias means 21e (FIG. 1A) so that the respective satellite gear pairs and said ring gear are not meshingly engaged when said satellite gear pairs are in repose. Each driven satellite gear 21a–30a is independently driven into meshing engagement with ring gear 40 only when planet gear 15 orbits around sun gear 16 in predetermined increments of angular rotation from one satellite gear to another. Since there are ten pairs of satellite gears in this example, they are spaced thirty six degrees apart from one another, so planet gear 15 must rotate that number of degrees to engage driving satellite gear 22 and drive it radially outwardly so that driven satellite gear 22a is driven into meshing engagement with ring gear 40. Such rotation loads bias means 22e (not shown) associated with satellite gear pair 22, 22a and unloads bias means 21e associated with satellite gear pair 21, 21a so that satellite gear pair 21, 21a is pivoted radially inwardly so that driven satellite gear 21a moves out of meshing engagement with ring gear 40.

As best understood in connection with FIG. 2, at its radially innermost extremity, ring gear 40 is connected to, or integrally formed with, hollow axle 42 which is in turn fastened by suitable fastening means to drive sprocket 44 around which a drive chain, not shown, is installed in the well-known way.

Indexing planet gear 15 from satellite gear 21, progressively to satellite gear 30 through said increments of angular rotation or orbital segments, while maintaining the same number of pedal rotation per unit of time, there being a pause in pedaling during each gear change, increases the speed of the bicycle because the respective diameters of the driven satellite gears 21a–30a and the number of teeth thereon progressively decreases.

As mentioned earlier, FIG. 1 depicts planet gear 15 in meshing engagement with driving satellite gear 21 and driven satellite gear 21a in meshing engagement with ring gear 40; this configuration is the first gear of this particular embodiment of the invention and results in the shortest distance of linear forward travel per revolution of the pedals, i.e., per revolution of main driving axle 12. Driving satellite gears 21–30 have one less tooth than the preceding gear and progressively smaller diameters, whereas the driven satellite gears 21a–30a each have one more tooth than the preceding gear and progressively larger diameters, as set forth in the following table:

| Gear | Teeth | Diameter | Sa/S | "GEAR" |
|---|---|---|---|---|
| Sun (16) | 41 | 2.05" | | |
| D (20) | 20 | 1.00" | | |
| P (15) | 41 | 2.05" | | |
| S (21) | 27 | 1.35" | 0.63 | 39" |
| S (21a) | 17 | 0.85" | | |
| S (22) | 26 | 1.30" | 0.69 | 43" |
| S (22a) | 18 | 0.90" | | |
| S (23) | 25 | 1.25" | 0.76 | 47" |
| S (23a) | 19 | 0.95" | | |
| S (24) | 24 | 1.20" | 0.83 | 52" |
| S (24a) | 20 | 1.00" | | |
| S (25) | 23 | 1.15" | 0.91 | 57" |
| S (25a) | 21 | 1.05" | | |
| S (26) | 22 | 1.10" | 1.00 | 62" |
| S (26a) | 22 | 1.10" | | |
| S (27) | 21 | 1.05" | 1.10 | 68" |
| S (27a) | 23 | 1.15" | | |
| S (28) | 20 | 1.00" | 1.20 | 75" |
| S (28a) | 24 | 1.20" | | |
| S (29) | 19 | 0.95" | 1.32 | 82" |
| S (29a) | 25 | 1.25" | | |
| S (30) | 18 | 0.90" | 1.44 | 90" |
| S (30a) | 26 | 1.30" | | |
| Ring Gear | 146 | 7.30" | | |

The "GEAR" calculation in the Table (the linear distance of forward travel of a bicycle per revolution of its pedals) is for a 48 tooth chainwheel sprocket, a 12 tooth freewheel sprocket, and 27 inch wheels. Thus, the sprocket ratio is 48/12=4.00. The sun gear/ring gear ratio 2.05/7.30=0.281, and the planet gear/drive gear ratio is 2.05. Accordingly, 0.281×2.05×4.00 ×27"=62.2." The value of "GEAR," defined above, for this particular set of values, is therefore equal to 62.2"×Sa/S; thus, the GEAR of first gear is 62.2"× 0.63=39, and the GEAR for the succeeding gears is calculated the same way and appears in the Table. Thus, the range of GEARS 90/39=2.30, i.e., the overall speed ratio is 2.3/ 1.0. For comparison purposes, the GEAR of a single speed bike is about "80."

Note in the Table that each satellite pair has a different gear ratio, starting at a reduction of 0.63 through unity to an increase of 1.44, giving a speed ratio of 2.3 to 1.0 as aforesaid. By making the sum of the satellite gears a constant, the gear engagement of each satellite gear 21–30 with planet gear 15 describes a circular orbit concentric with main drive axle 12.

FIGS. 3 and 4 depict planet gear assembly housing 46 in greater detail than provided in FIGS. 1 and 2.

The means for causing the displacement of planet gear 15 from satellite gear to satellite gear will now be described. There are two embodiments of the clutch and gear-changing or gear selector mechanism, the first of which is depicted in FIGS. 1 and 2 and which is also depicted in enlarged form in FIGS. 5A and 5B and denoted 50 as a whole.

Assembly 50 is a gear selector and clutch assembly. Assembly 50, when engaged, drives gear selector bevel gear 52 which is in meshing engagement with bevel gear 17. As perhaps best understood in connection with FIG. 4, bevel gear 17 is formed integrally with or attached to housing 46. Said housing supports bearings 11a, 11b which bearings rotatably support the opposite ends of planet gear axle 11. Accordingly, rotational displacement of housing 46 causes orbital movement of said planet gear axle 11 and hence of gears 15 and 20 which are carried by said axle. Thus, each incremental rotation of bevel gear 17 is translated into a simultaneous and corresponding incremental rotation of planet gear axle 11 and said gears 15 and 20, thereby causing the planet gear assembly to orbit in 36 degree increments, in this particular embodiment, i.e., from one driving satellite gear to the next, as required for the 10 speed embodiment of the invention.

Figure 5A:
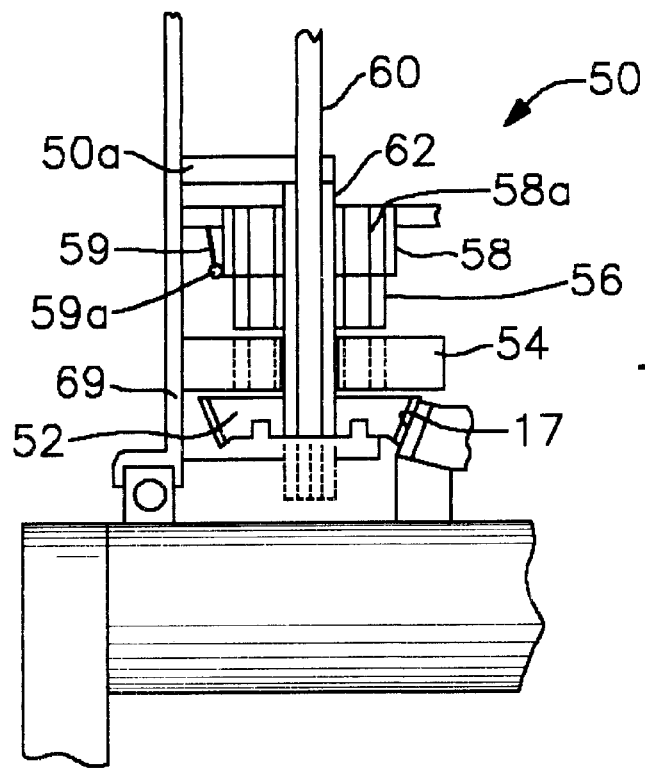
FIG. 5A is an elevational view of the clutch assembly of FIG. 1 when the clutch is disengaged so that a gear change may be performed.
Figure 5B:
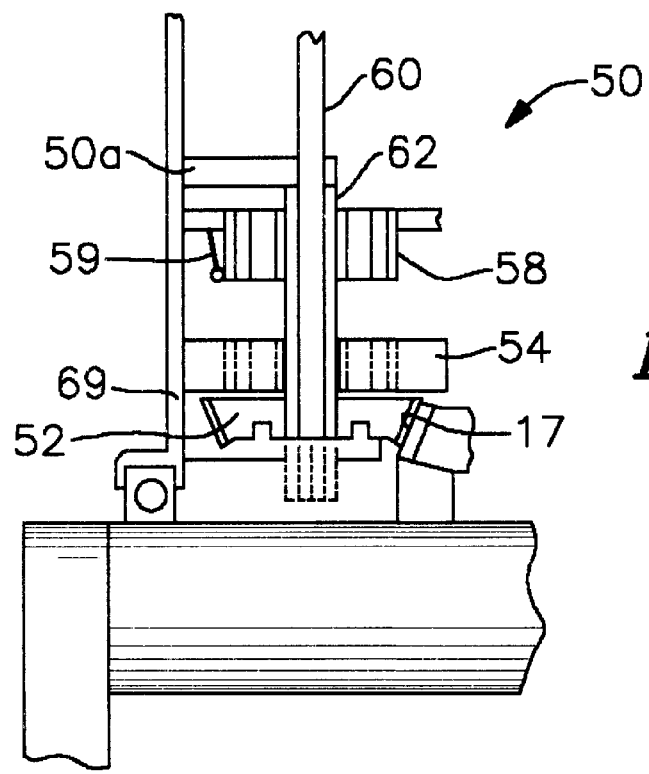
FIG. 5B is a view like FIG. 5A but depicting the clutch in its engaged configuration.
Figure 6:
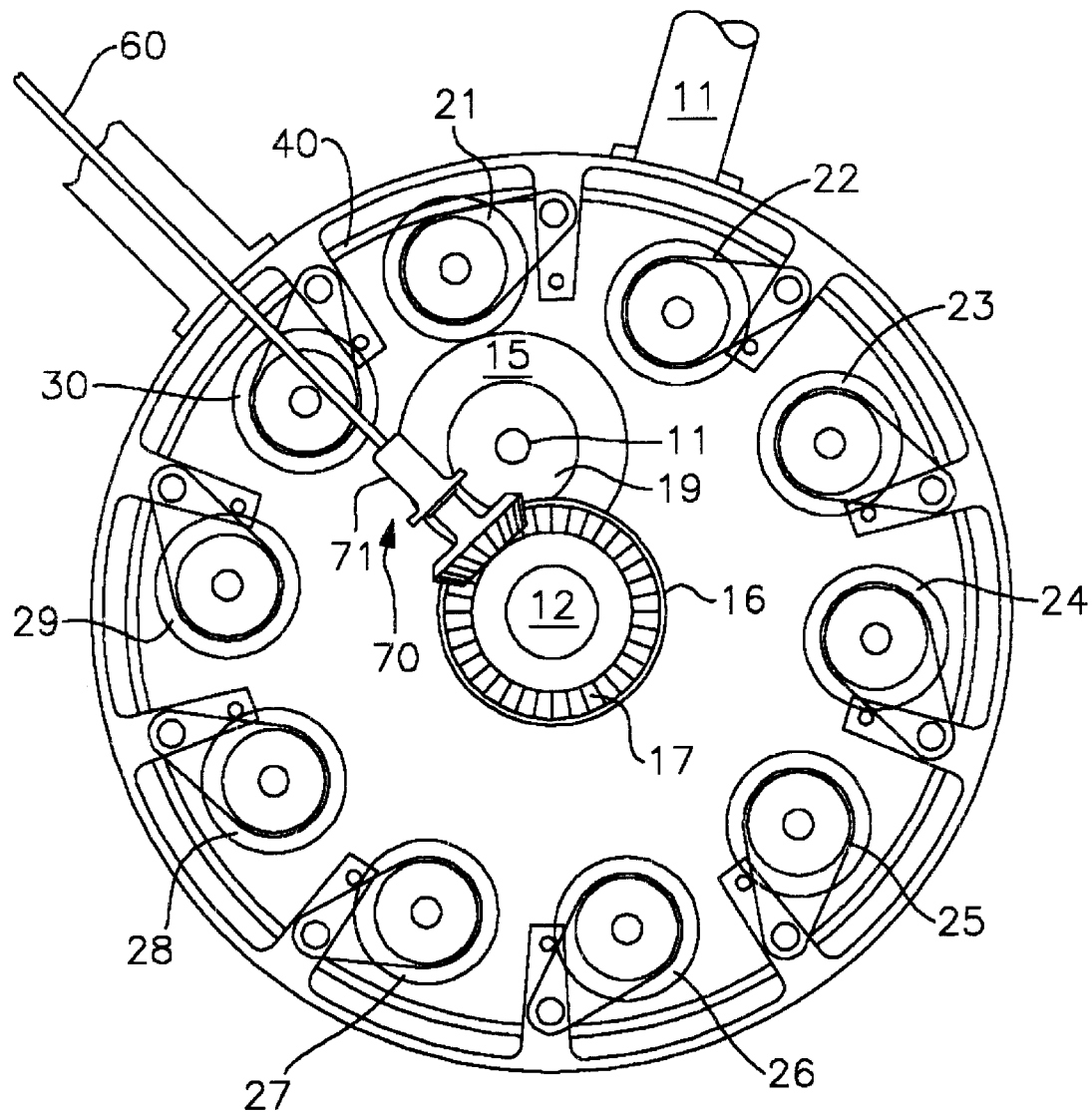
FIG. 6 is a side elevational view like that of FIG. 1, but depicting a second embodiment of the novel clutch assembly.
Figure 7:
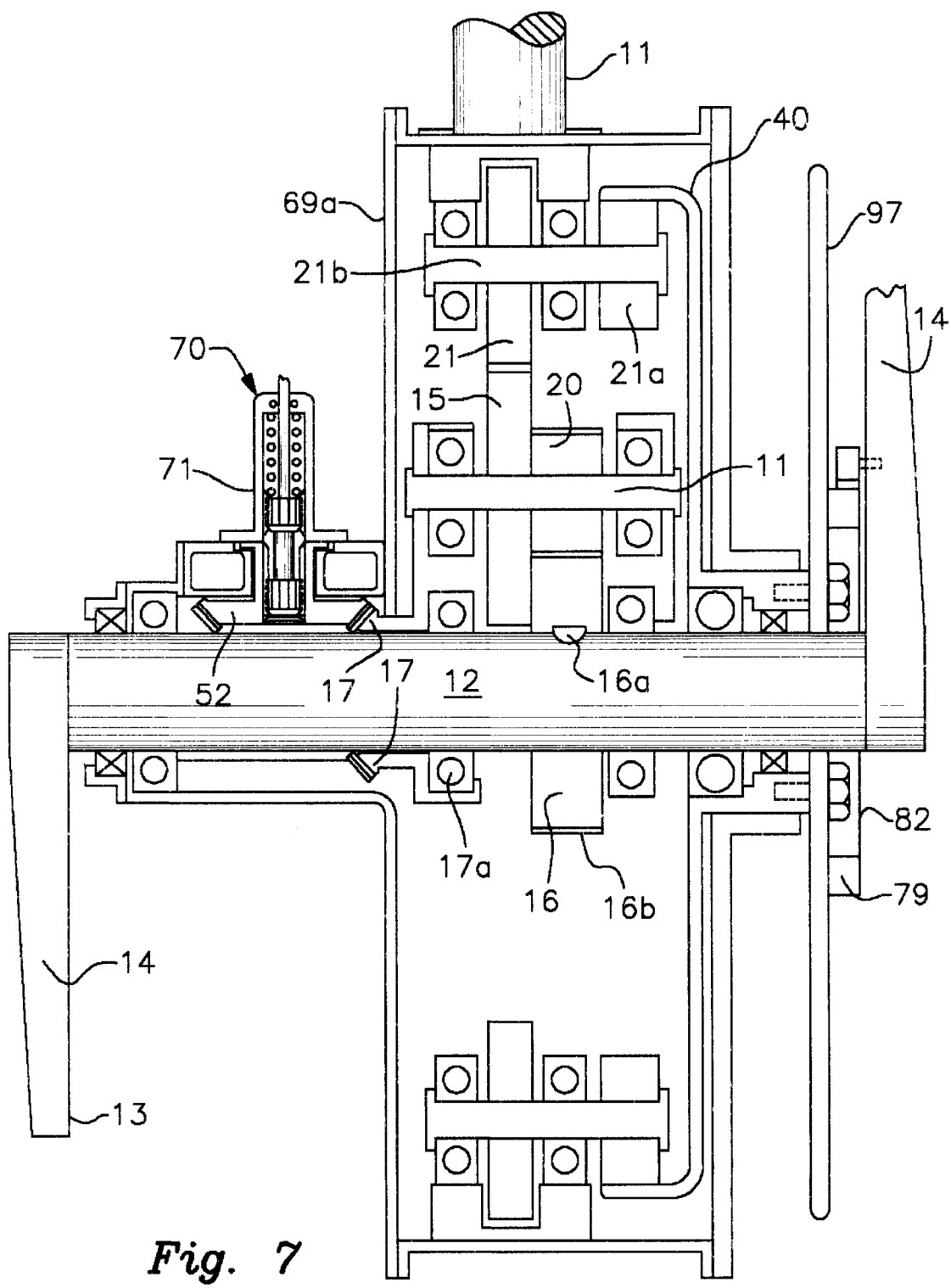
FIG. 7 is a sectional view taken along line 7—7 in FIG. 6.

Turning now to FIG. 5A, it will there be seen that gear selector bevel gear 52 is connected to an enlarged section of remote control cable 62 by a spline fitting that transmits rotational movement but not axial movement. Ten-toothed hollow gear 54 is fastened to housing wall 69 and does not rotate or move axially and is loosely fit to control cable 62. Ten-toothed spur gear or external spline 56 and ten-grooved cylinder or cylindrical drum 58 are fastened rigidly to each other and to control cable 62 so that all three elements move together conjointly. These three units are depicted in the upward (engaged) position in FIG. 5A, and in the downward, or disengaged, position in FIG. 5B. In the engaged position, spur gear 56 fits into hollow gear or internal spline 54, thereby locking the assembly against rotation. The spline fitting of control cable 62 to bevel gear 52 also prevents rotation of said gear selector bevel gear 52, meshing bevel gear 17, and planet gear assembly housing 46 so that planet gear 15 is locked into engagement with a selected driving satellite gear 21–30.

Cylindrical drum 58 surmounts external spline 56; it has ten equidistantly spaced grooves 58a formed therein about its circumference, said grooves being parallel to the axis of rotation of said drum. A flexible and resilient detent means 59 having a small spherical member 59a secured to its distal end is self-biased to urge said spherical member into said grooves when drum 58 is rotated about its axis of rotation. The engagement of detent means 59 and grooves 58a momentarily stops rotation of drum 58 so a gear setting can be felt by the operator of clutch assembly/gear selector 50 and such sensation gives the operator feedback, i.e., it allows the operator to know that a shift setting has been attained. The engagement of the detent means 59 and the grooves 58a also prevents rotation of drum 58 when a gear setting has been achieved.

Cylindrical drum 58 is rotated about its axis of rotation by rotation of control cable 60 because said drum 58 is secured to said control cable for conjoint movement, whether axial or rotational, therewith. Thus, when cable 60 is not rotated about its axis, it prevents the entire assembly, including bevel gear 52, from rotating.

Figures 9, 10:
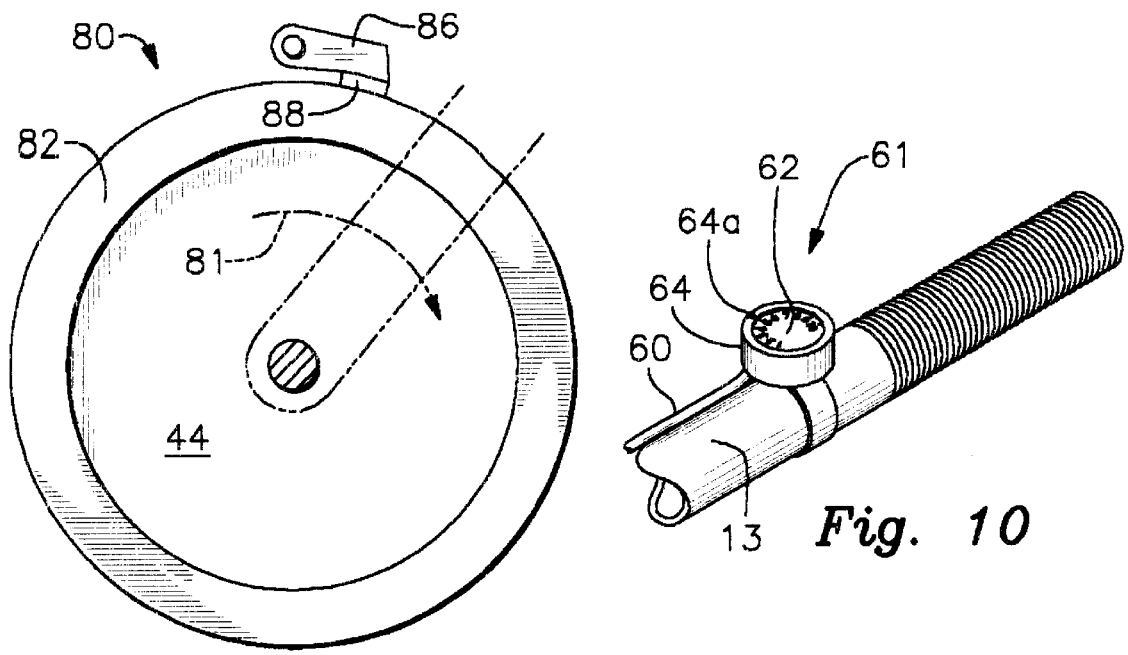
FIG. 9 is an elevational view taken along line 9—9 in FIG. 2.
FIG. 10 is a perspective view of a gear selector mounted on a bicycle handlebar for facilitating gear changing.

To rotate control cable 60, the bicycle rider operates a conveniently-located speed selector switch 61; in FIG. 10 said switch is depicted mounted upon a bicycle handlebar 13. Switch 61 may take many forms, all of which are within the scope of this invention. In a preferred form, depicted in FIG. 10, a button 62 is pressed and such pressing action releases a bias means so that said button pops up. The proximal end of control cable 60 is attached to an underside of said button; such popping up therefor displaces control cable 60 in an upward (distal-to-proximal) axial direction, thereby lifting external spline 56 from internal spline 54 and disengaging said gears from one another so that planet gear 15 is free to traverse an orbital segment. The rider then rotates button 62, which rotates control cable 60 and hence drum 58 and external spline 56. Button 62 is positioned centrally of a nonrotatable dial 64. The various speeds are imprinted on button 62; dial 64 includes a pointer 64a so that rotation of said button brings said pointer 64a into selective pointing relation to one of said gear speeds. The operator feels spherical member 59a engaging a groove 58a in drum 58 when pointer 64a aligns with a gear speed imprinted on button 62. The operator then pushes down on button 62 to re-load the bias means positioned beneath it. The rotation of control cable 60 rotates cylindrical drum 58 and hence external spline 56 but does not cause rotation of internal spline 54 because control cable 60 fits loosely therewithin. Thus, pushing down on button 62 after rotating it drives external spline 56 back into internal spline 54 and thereby causes rotation of bevel gear 17 and hence rotation of housing 46 and hence orbital motion of planet gear 15 in a thirty six degree increment about sun gear 16, thereby engaging the next driving satellite gear and driving it associated driven satellite gear into meshing relation with ring gear 40.

Control cable 60, cylindrical drum 58, and external spline 56 are fastened together and therefore move up and down and rotationally as a unit as aforesaid. Internal spline 54 is fastened to housing 69 and therefore cannot move. The enlarged section of the cable from stop 50a downward has longitudinally extending grooves formed therein and forms a tight grooved fit with grooved cylindrical drum 58 and external spline 56, but makes a sliding spline fit with gear selector bevel gear 52, and simply a loose fit with internal spline 54, imparting neither rotation nor up and down movement force to said internal spline.

Alternatively, the ten-grooved cylinder may be omitted and replaced by an equivalent device mounted on the handlebar of the bicycle. Such equivalent device would transmit a click-stop action to the gear changer by means of a flexible cable. The cable should be protectively enclosed in flexible transparent tubing to permit visual inspection of the cable and to prevent intrusion of rainwater, dirt, and the like.

A second embodiment of the clutch and gear separator mechanism 50 is depicted in FIGS. 6, 7, 8A and 8B and is denoted 70 as a whole. Significantly, this embodiment includes its own independent housing 71 so assembly 70 need not be contained within housing 69 (FIG. 2) that encloses the parts of the first embodiment. Accordingly, the weight of the novel assembly is lessened and the expense associated with a larger housing is saved; housing 69a (FIG. 7) is smaller and lighter than housing 69 (FIG. 2).

Figure 8A:
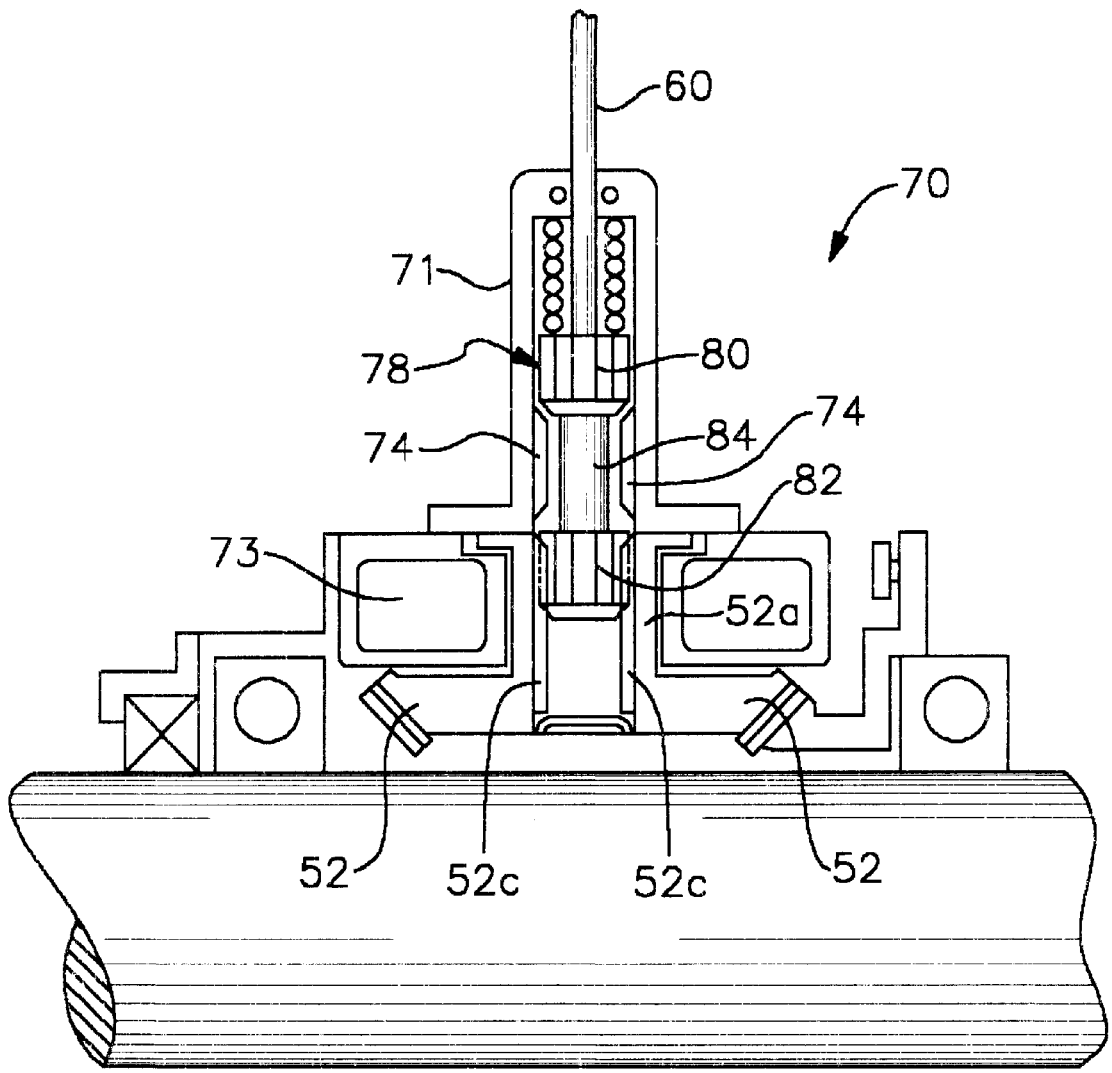
FIG. 8A is an elevational view of the clutch assembly of FIGS. 6 and 7 when the clutch is disengaged so that a gear change may be performed.
Figure 8B:
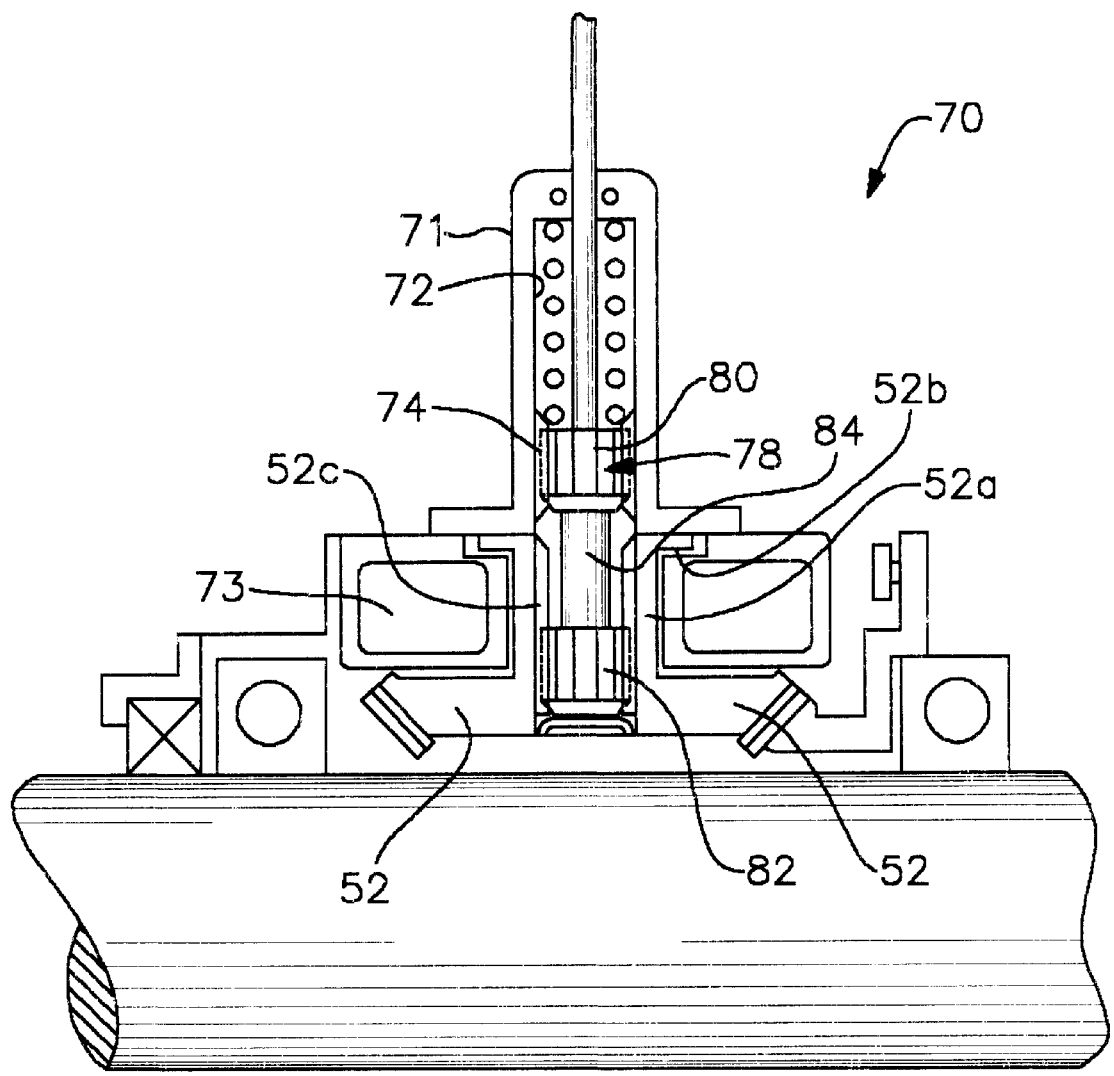
FIG. 8B is a view like that of FIG. 8A but depicting the clutch in its engaged configuration.

As best understood in connection with FIGS. 8A and 8B, independent housing 71 includes a cylindrical inner sidewall 72 having inwardly extending splines 74 formed therein at the bottom or radially innermost extent thereof. Said housing 71 sits atop a support member 73. Gear selector bevel gear 52 has a radially outwardly extending neck 52a that terminates in an annular flange 52b, and inwardly extending splines 52c are formed in said neck. Upper splines 74 cannot rotate about the longitudinal axis of cable 60 because housing 71 is not rotatably mounted. Lower splines 52c, however, forming an integral part of rotatably mounted gear selector bevel gear 52, are free to rotate when said splines 74 and 52c are not interconnected to one another.

A piston-like member 78 is slideably mounted for reciprocal motion within independent housing 71. Member 78 has an upper head 80 and a lower head 82 interconnected by narrow neck 84. Upper head 80 has slots that slideably receive splines 74 and lower head 82 has slots that slideably receive splines 52c; the slots are unnumbered to avoid cluttering the drawings. In FIG. 8B, the slots formed in upper and lower heads 80 and 82 and splines 74, 52c, respectively, are engaged with one another. Since independent housing 71 cannot rotate about its vertical axis of symmetry, the nonrotatable connection between upper head 80 and upper splines 74 prevents rotation of gear selector bevel gear 52. However, as depicted in FIG. 8A, when piston-like member 78 is in its "up" position, i.e., when control cable 60 has been displaced in a distal-to-proximal direction, the slots formed in upper head 80 are disengaged from splines 74 so that cable 60 and piston-like member 78 are free to rotate about their common axis of rotation. However, splines 52c remain engaged with the slots formed in lower head 82, so gear selector bevel gear 52 rotates conjointly with piston-like member 78 and control cable 60. Rotation of gear selector bevel gear 52 causes rotation of bevel gear 17 with which it is meshed, and said rotation causes orbital motion of housing 46 with which bevel gear 17 is integrally formed. Rotation of housing 46 causes orbital motion of planet gear axle 11 and planet gear 15 which orbital motion brings said planet gear into meshing engagement with a driving satellite gear as explained above. After a gear change has been completed, the bicycle rider causes control cable 60 to travel radially inwardly again, i.e., in a proximal-to-distal direction, so that the parts depicted in FIG. 8A return to their FIG. 8B position where gear selector bevel gear 52 is again prevented from rotation by means of the interlocking of splines 74 with the slots formed in upper head 80 of piston-like member 78.

One of extraordinary skill in the mechanical arts might observe that the conventional coaster brakes of a bike equipped with the novel assembly will be ineffective during the brief moment that a gear is changed, i.e., when planet gear 15 is between satellite gears, a braking action performed in the conventional manner will have no effect because ring gear 40 is unconnected to main drive axle 12 at that moment. A rider slowly climbing a hill might thus experience a short backward roll during gear changing. This problem is solved by a braking apparatus 80 depicted in FIG. 9. Apparatus 80 includes a disc 82 mounted to drive sprocket 44 and a pivotally mounted pawl 86 biased by a spring into engagement with a peripheral edge of said disc 82. A brake pad 88 at the leading end of pawl 86 slides, essentially friction free, over the peripheral edge or circumference of disc 82 when the pedals are rotating in driving relation to the drive chain (not shown), thereby rotating disc 82 in the direction indicated by directional arrow 81. Brake pad 88 digs into said peripheral edge of disc 82 and frictionally engages it to prevent or inhibit its rotation when the pedals are not driving said drive chain. In this way, when the bicycle operator stops pedaling, momentarily, to accomplish a gear change, brake pad 88 digs in and engages disc 82 so that a braking action is automatically achieved during such moment.

Those skilled in the mechanical arts will appreciate the simplicity and inherent reliability of this novel assembly of parts. By reducing gear diameters and increasing gear widths, or by increasing gear diameters and decreasing gear widths, the parts may be sized for a wide range of bicycle sizes, including bikes for small children and large adults.

It will thus be seen that the objects set forth above, and those made apparent from the foregoing description, are efficiently attained and since certain changes may be made in the foregoing construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. An apparatus for providing speed selection, gear changing, and power transmission in a bicycle of the type having a single drive sprocket and coaster brakes, comprising:
   a sun gear keyed to a main drive axle of said bicycle for simultaneous and conjoint rotation therewith;
   a bevel gear journaled to said main drive axle in axially spaced relation to said sun gear;
   a planet gear axle disposed radially outwardly of said main drive axle, in parallel relation thereto;
   a drive gear mounted on said planet gear axle, said drive gear meshingly engaged to said sun gear so that rotation of said sun gear imparts rotation to said drive gear and said planet gear axle;
   a planet gear keyed to said planet gear axle so that rotation of said planet gear axle is imparted to said planet gear, said planet gear being mounted to said planet gear axle in axially spaced apart relation to said drive gear;
   a plurality of satellite gear axles collectively disposed radially outwardly of said planet gear axle;
   each satellite gear axle of said plurality of satellite gear axles having a driving satellite gear mounted to a first end thereof and a driven satellite gear mounted to a second end thereof in axially spaced apart relation to said driving satellite gear;
   a ring gear positioned in concentric relation to said main drive axle and in radially outwardly spaced relation to said plurality of satellite gear axles;
   said ring gear being secured to said drive sprocket so that rotation of said ring gear imparts rotation to said drive sprocket;
   a clutch and gear selector means for selectively causing said planet gear to orbit around said main drive axle in discrete, predetermined angular increments;
   a bias means for biasing each of said driven satellite gears out of meshing engagement with said ring gear when in repose, said driven satellite gears selectively meshingly engaging said ring gear when said bias means is overcome;
   said planet gear selectively engaging a preselected driving satellite gear and overcoming said bias means to drive said preselected driven satellite gear into meshing engagement with said ring gear when said planetary gear is displaced in said discrete angular relation to said main drive axle by said clutch and gear selector means; and
   a handlebar-mounted control means for controlling operation of said clutch and gear selector means.

2. The apparatus of claim 1, wherein said handlebar-mounted control means includes a control cable having a proximal end positioned near said handlebar and a distal end connected to said clutch and gear selector means.

3. The apparatus of claim 2, wherein said handlebar-mounted control means further includes a dial upon which is imprinted a plurality of indicia indicating differing gear settings, and a pointer means movably mounted with respect to said dial so that a bicycle operator changes gear settings by moving said pointer means from one indicia means to another, said movement of said pointer means effecting movement of said control cable.

4. The apparatus of claim 2, wherein said control cable is mounted for axial and rotational movement.

5. The apparatus of claim 4, wherein said control cable is displaced in a distal-to-proximal direction to disengage said clutch and gear selector means and in a proximal-to-distal direction to engage said clutch and gear selector means.

6. The apparatus of claim 5, wherein said control cable is rotated about its axis to change from one gear setting to another, said change being made only when said clutch and gear selector means is disengaged.

7. The apparatus of claim 2, said clutch and gear selector means further comprising:

a rotatably mounted gear selector bevel gear;

a rotatably mounted internal spline secured to said gear selector bevel gear so that rotation of said internal spline is imparted to said gear selector bevel gear;

a rotatably mounted, axially displaceable external spline having a first, retracted position where it is positioned externally of said internal spline in non-meshing relation thereto, and a second, extended position where it is positioned internally of said internal spline and is meshingly engaged therewith;

said external spline being secured to said control cable;

said handlebar-mounted control means adapted to selectively displace said external spline into and out of engagement with said internal spline so that power is transmitted from said sun gear to said ring gear and hence to said drive sprocket when said external spline is meshingly engaged with said internal spline and so that a gear of said bicycle may be changed when said external spline is out of engagement with said internal spline.

8. The apparatus of claim 7, further comprising:

a cylindrical drum mounted to said external spline for conjoint rotation therewith;

a plurality of grooves formed in a peripheral surface of said cylindrical drum, in axial alignment with a rotational axis of said cylindrical drum;

a biased detent means that is adapted to press against said peripheral surface of said cylindrical drum, said biased detent means entering into a groove only when a discrete gear selection has been made by said operator, said operator being able to physically detect entry of said biased detent means into a groove.

9. The apparatus of claim 6, said clutch and gear selector means further comprising:

an independent housing having an inwardly extending spline;

a gear selector bevel gear having a hollow neck and an inwardly extending spline formed in said hollow neck;

a piston member having a first head that is slotted to slideably engage the spline formed in said independent housing;

said piston member having a second head that is slotted to slideably receive the spline formed in said hollow neck of said gear selector bevel gear;

a narrow neck interconnecting said first and second heads so that said second head is held against rotation when said first head is held against rotation by said inwardly extending spline formed in said independent housing and so that said second head is free to rotate when said first head is disengaged from said inwardly entending spline formed in said independent housing;

said first head being disengaged from said inwardly extending spline formed in said independent housing when said control cable is displaced in said distal-to-proximal direction;

said second head rotating and imparting said rotation to said gear selector bevel gear when said control cable has been displaced in said distal-to-proximal direction and rotated about its axis;

whereby rotation of said control cable about its longitudinal axis, by a preselected angular increment, after said control cable has been displaced in said distal-to-proximal direction, effects rotation of said second head and hence of said gear selector bevel gear in said preselected angular increment.

10. The apparatus of claim 1, further comprising auxiliary braking means for braking said bicycle during a moment when gears are being changed, said auxiliary braking means comprising:

a disc mounted to said drive sprocket;

a pawl pivotally mounted to a crank arm;

a brake pad secured to a free end of said pawl;

a bias means for urging said brake pad into frictional engagement with a peripheral edge of said disc;

said brake pad configured to slide substantially friction free when said drive sprocket is rotating in response to pedaling of said bicycle; and said brake pad configured to frictionally engage said peripheral edge of said disc when said drive sprocket is disengaged from said drive axle of said bicycle.

* * * * *